(12) United States Patent
Jeong et al.

(10) Patent No.: US 6,229,859 B1
(45) Date of Patent: May 8, 2001

(54) SYSTEM AND METHOD FOR HIGH-SPEED, SYNCHRONIZED DATA COMMUNICATION

(75) Inventors: Deog-Kyoon Jeong, Seoul (KR); Gijung Ahn, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/146,818

(22) Filed: Sep. 4, 1998

Related U.S. Application Data

(60) Provisional application No. 60/058,040, filed on Sep. 4, 1997.

(51) Int. Cl.[7] .............................. H04L 7/00; H03D 3/24; H03L 7/06
(52) U.S. Cl. ......................... 375/354; 327/147; 375/376
(58) Field of Search .................................... 375/354, 219, 375/327, 358, 373, 376, 372, 362, 360, 355; 327/141, 144, 147, 156

(56) References Cited

U.S. PATENT DOCUMENTS

| | | | |
|---|---|---|---|
| 4,672,639 | 6/1987 | Tanabe et al. ........................ | 375/118 |
| 5,430,485 | * 7/1995 | Lankford et al. ..................... | 348/423 |
| 5,587,709 | 12/1996 | Jeong .................................... | 341/100 |
| 5,983,287 | * 11/1999 | Kuroiwa et al. ...................... | 710/14 |

FOREIGN PATENT DOCUMENTS

| | | | |
|---|---|---|---|
| 0 498 064 A2 | 8/1992 | (EP) | ................................ H03L/7/08 |
| WO 97/42731 | 11/1997 | (WO) | ............................. H04L/7/033 |

OTHER PUBLICATIONS

Kyeongho Lee, et al., A CMOS Serial Link for Fully Duplexed Data Communication, (Jun. 1995), pp. 601–612, 2334c IEICE Transactions on Electronics E78–C No. 6, Tokyo, JP.

PCT International Search Report, Jan. 5, 1999.

* cited by examiner

*Primary Examiner*—Chi Pham
*Assistant Examiner*—Khai Tran
(74) *Attorney, Agent, or Firm*—Fenwick & West LLP

(57) ABSTRACT

A system for transmission and recovery of original digital data includes an encoder, a transmitter, a receiver, a decoder, and an analog phase locked loop. The analog phase locked loop supplies a sender's clock to the transmitter and a receiver's clock to the receiver, where the sender's clock frequency is a first integer multiple of the system clock frequency, and the receiver's clock frequency is a second integer multiple of the sender's clock frequency within 0.1% tolerance. In a normal flow situation, data frames are output by the receiver in alternate cycles of the system clock. In an overflow situation, data frames are output by the receiver in consecutive cycles of the system clock. In an underflow situation, data frames are not output by the receiver in consecutive cycles of the system clock.

20 Claims, 11 Drawing Sheets

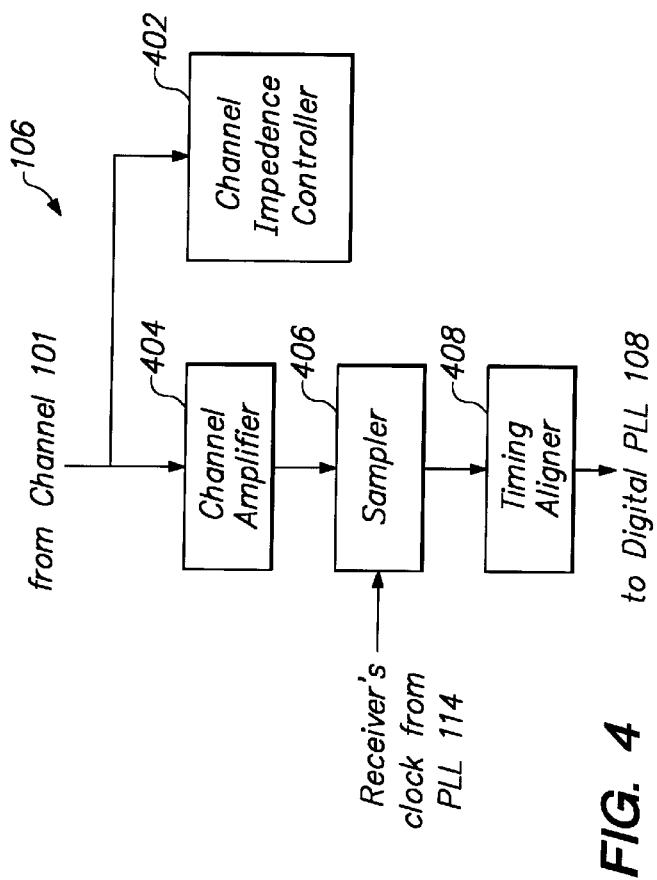
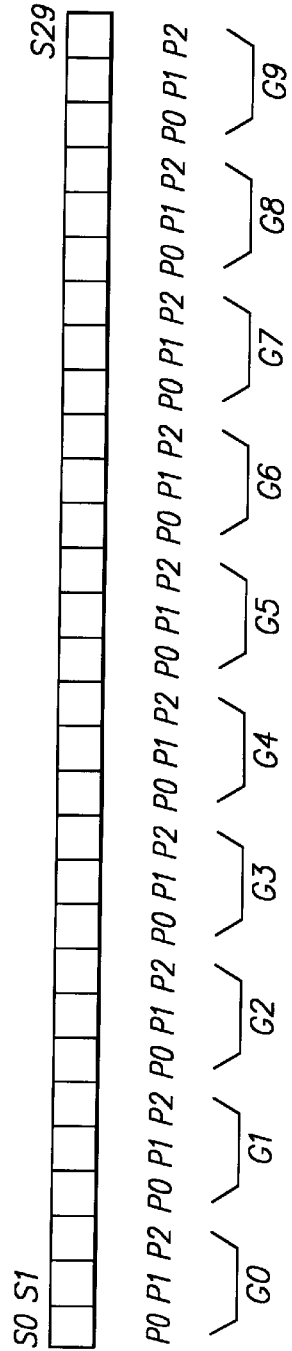
FIG. 4
FIG. 7

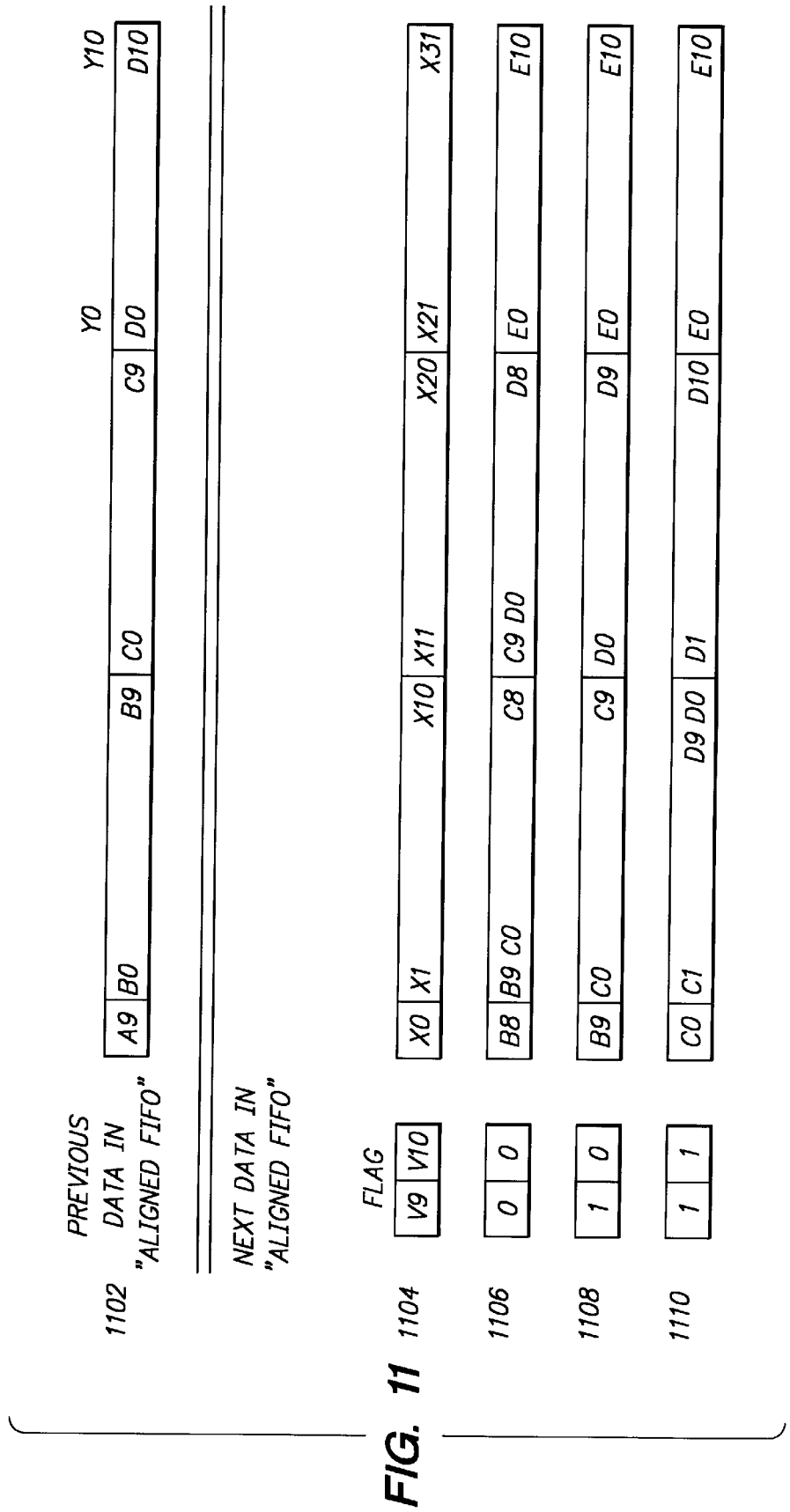

| Graph Arrow | Current Flags | | Current Frame Pointer | Next Frame Pointer | Next Valid Bit |
|---|---|---|---|---|---|
| | V9 | V10 | | | |
| A | 0 | 0 | X[n] | X[n+1] | 1 |
|   | 1 | 0 |      | X[n]   | 1 |
|   | 1 | 1 |      | X[n-1] | 1 |
| B | 0 | 0 | X[n] | X[n+1] | 0 |
|   | 1 | 0 |      | X[n]   | 0 |
|   | 1 | 1 |      | X[n-1] | 0 |
| C | 1 | 1 | X[1] | X[0] | 1 |
| D | 1 | 0 | X[10] | X[1] | 1 |
| E | 0 | 0 | X[1] | X[1] | 0 |
| F | 1 | 0 | x[10] | X[1] | 0 |
| G | 0 | 0 | X[10] | X[1] | 0 |
| H | 1 | 1 | X[0] | X[10] | 1 |

SYSTEM AND METHOD FOR HIGH-SPEED, SYNCHRONIZED DATA COMMUNICATION

This Application claim benefit to Provisional 60/058,040 filed Sep. 4, 1997.

BACKGROUND OF THE INVENTION

1. Technical Field

This invention relates to data communication systems. More particularly, this invention relates to the recovery using oversampling in a receiving system of digital data transmitted via a high-speed link.

2. Description of Related Art

As electronic and computer technology continues to evolve, communication of information among different devices, either situated near by or at a distance becomes increasingly important For example, it is now more desirable than ever to provide for high speed communications among different chips on a circuit board, different circuit boards in a system, and different systems with each other. It is also increasingly desirable to provide such communications at very high speeds, especially in view of the large amount of data required for data communications in intensive data consuming systems using graphical or video information, multiple input-output channels, local area networks, and the like.

It is particularly desirable to enable individual personal computers, workstations, or other computing devices, within which data is normally internally transferred using parallel data buses, to communicate with each other over relatively simple transmission lines. Such transmission lines typically include only one or two conductors, in contrast with the 64-bit and wider data paths within computing systems now commonly available.

A communication system that includes oversampling is often utilized to recover data transmitted data. Such a system includes a receiver which samples the incoming serial data stream at a rate greater than the rate at which symbols (bits) are being transmitted. For example, in a three-times (3×) oversampling receiver, the incoming data stream is sampled at a rate approximately three times the symbol rate. However, there are various problems to overcome in order to effectively implement such a receiver when the rate of data transmission is very high.

One problem is the difficulty in handling overflow and/or underflow of incoming data at the receiving end. For example, usually the output of a 3× oversampler contains sets of three consecutive 1s or 0s, but occasionally 4 or 2 consecutive 1s or 0s may occur. Such overflow and/or underflow will occasionally occur, for example, when the frequency of the local clock of the transmission system is not in precise synchronization with the local clock of the receiving system, when there is jitter in the sampling clock, and so on.

Other problems include difficulties in determining the correct symbol (bit) boundaries in the oversampled data stream and difficulties in determining the correct values of the symbols from the multiple samplings of each symbol.

SUMMARY OF THE INVENTION

The above described needs are met and problems are solved by the present invention. A system for transmission and recovery of original digital data includes an encoder, a transmitter, a receiver, a decoder, and an analog phase locked loop. The analog phase locked loop supplies a sender's clock to the transmitter and a receiver's clock to the receiver, where the sender's clock frequency is a first integer multiple of the system clock frequency, and the receiver's clock frequency is a second integer multiple of the sender's clock frequency within 0.1% tolerance. In a normal flow situation, data frames are output by the receiver in alternate cycles of the system clock. In an overflow situation, data frames are output by the receiver in consecutive cycles of the system clock. In an underflow situation, data frames are not output by the receiver in consecutive cycles of the system clock.

BRIEF DESCRIPTION OF THE DRAWINGS

FIG. 4 is a block diagram of an oversampler located in the receiving side of the communication system according to a preferred embodiment of the present invention.

FIG. 7 is a diagram illustrating the mapping of the oversampled data to groups and phases within the digital PLL according to a preferred embodiment of the present invention.

FIG. 11 is a diagram illustrating the operation of an aligned FIFO within the frame aligner according to a preferred embodiment of the present invention.

DESCRIPTION OF THE PREFERRED EMBODIMENTS

Overall System

Figure 1:
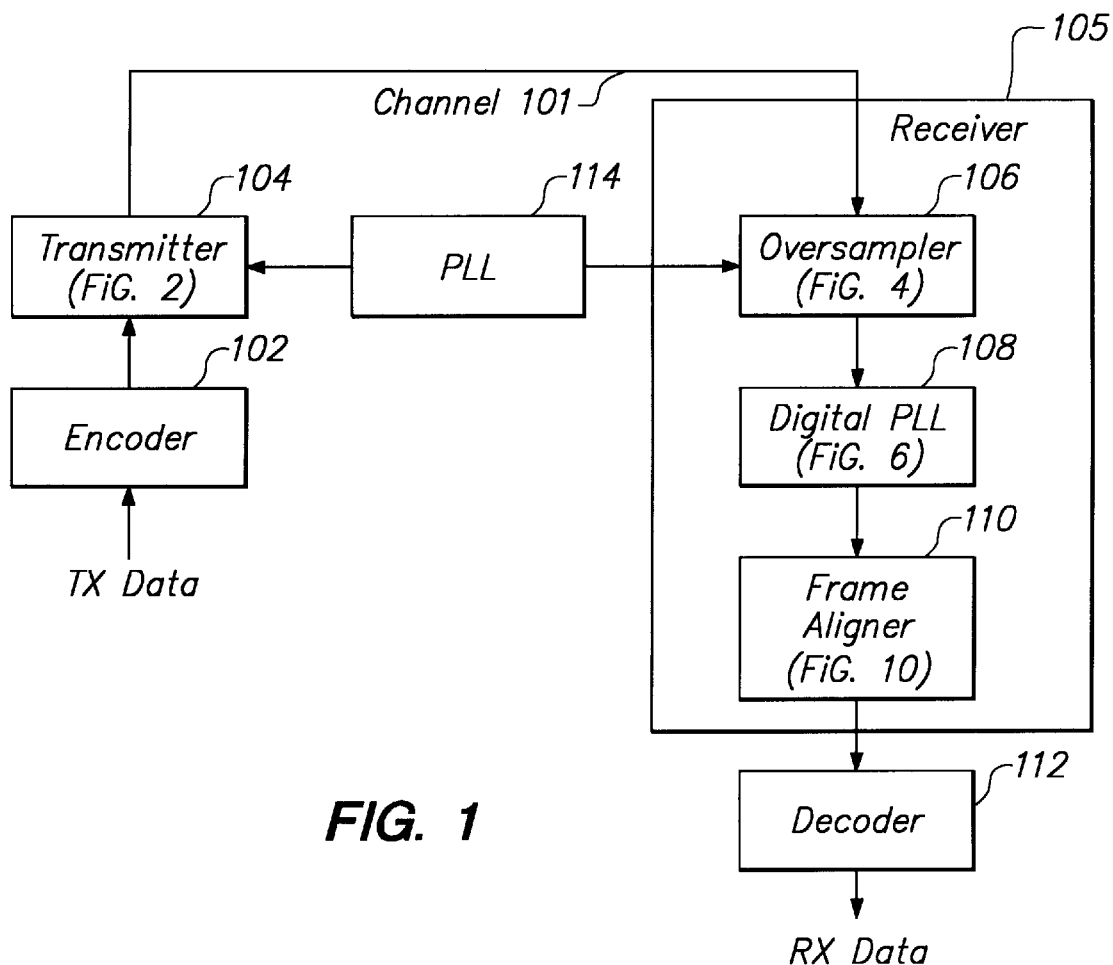
FIG. 1 is a block diagram of a communication system for transmission and recovery of digital data via a communication channel according to a preferred embodiment of the present invention.

FIG. 1 is a block diagram of a communication system for transmission and recovery of digital data via a communication channel 101 according to a preferred embodiment of the present invention. The communication system includes the channel 101, an encoder 102, a transmitter 104, a receiver 105, a decoder 112, and a phase locked loop (PLL) 114. The receiver 105 includes an oversampler 106, a digital PLL 108, and a frame aligner 110.

The channel 101 comprises a high-speed point-to-point link in a preferred embodiment of the present invention. Such a link includes a transmission line made from twisted pair, coaxial cable, or some other implementation of the physical layer.

The encoder 102 receives original data to be transmitted (TX data) from a source (not shown). For example, the original data may be graphics data from a computer for display on a graphics monitor, and the encoder 102 may be embodied within a chip on a graphics card in the computer. In a preferred embodiment, the original data is received in parallel form from the source. The source may, for example, comprise of a graphics processor chip, or a bus of a workstation, server, or personal computer. The encoder 102 encodes the original data in order to make it more suitable for transmission over the channel 101. Such encoding may, for example, transform the data to incorporate error-correction capabilities, minimize transitions in the data to reduce electromagnetic interference, incorporate special signaling (such as synchronization characters), and so on. The encoded data may include more bits than the data before encoding. For example, the data before encoding may be organized in 8-bit frames (bytes). The encoding process may, for example, convert each of those 8-bit frames to 10-bit frames. In other embodiments, different encoding schemes may be employed, such as 8-to-9 bit encoding schemes, or encoding schemes from m bits to n bits. After the data is encoded, the encoder 102 outputs the encoded data to the transmitter 104 for transmission over the channel 101. In a preferred embodiment, the transmitter 104 receives the encoded data in parallel form from the encoder 102 and converts the encoded data from parallel form to serial form for output as an encoded data waveform to the channel 101. In addition, in a preferred embodiment, the transmitter 104 receives a sender's clock signal from the PLL 114 in order to synchronize its operation with that of the receiver 105 to within 0.1% tolerance. The transmitter 104 sends the encoded data waveform to the channel 101 in synchronization with the sender's clock signal.

The receiver 105 receives the encoded data waveform from the channel 101. Within the receiver 105, the encoded data waveform is received by the oversampler 106. In a preferred embodiment, the oversampler 106 also receives a receiver's clock signal from the PLL 114 in order to synchronize its operation with that of the transmitter 104. The oversampler 106 obtains an integer multiple number of samples per symbol from the encoded data waveform to generate an oversampled data stream, and so the receiver's clock signal which has a frequency that is an integer multiple of the frequency of the sender's clock signal. In a preferred embodiment, the receiver's clock frequency is three times that of the sender's clock frequency to within a tolerance of 0.1%. For example, if the sender's clock is 100 MHz, then the receiver's clock would be 300 MHz. In other words, on average three samples are obtained per symbol from the encoded data stream. The oversampler 106 outputs the oversampled data stream to the digital PLL 108. The digital PLL 108 receives the oversampled data stream and extracts clock information from edges (data transitions from 1 to 0, or 0 to 1) in the oversampled data stream. In a preferred embodiment, the digital PLL 108 also generates left-aligned data frames and related flag information for output to the frame aligner 110. The frame aligner 110 receives the left-aligned data frames and the related flag information and outputs aligned data frames and output valid signal to the decoder 112. Finally, the decoder 112 receives the aligned data frames and output valid signal and decodes the aligned data frames to regenerate the original data and output the regenerated data as the received data (RX data). In a preferred embodiment, a liquid crystal display (LCD) controller chip receives the RX data from the decoder 112 and has the RX data displayed graphically on the display.

Transmitter

Figure 2:
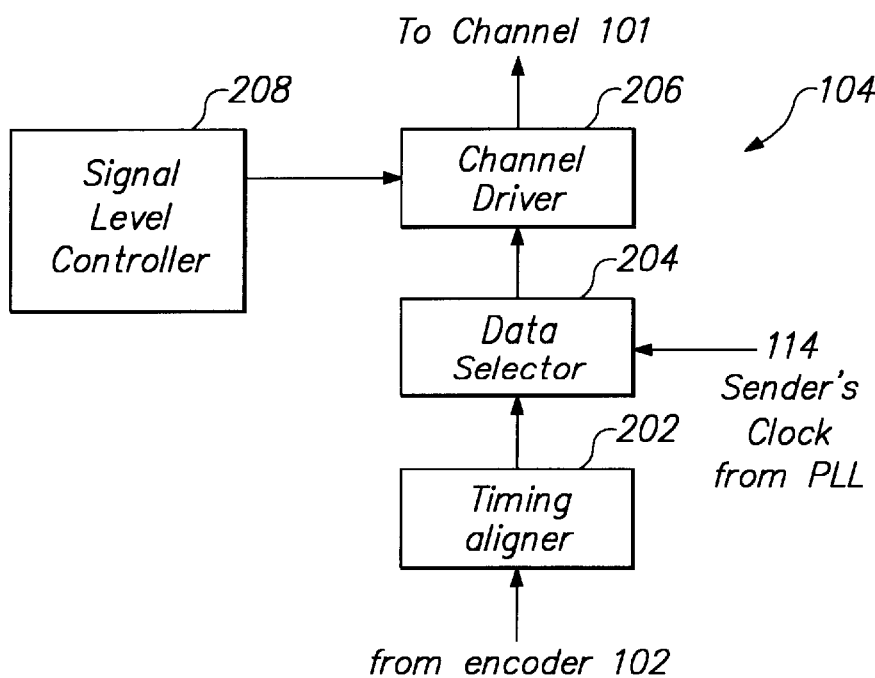
FIG. 2 is a block diagram of a transmitter within the communication system according to a preferred embodiment of the present invention.

FIG. 2 is a block diagram of a transmitter 104 within the communication system according to a preferred embodiment of the present invention. The transmitter 104 includes a timing aligner 202, a data selector 204, a channel driver 206, and a signal level controller 208.

Figure 3:
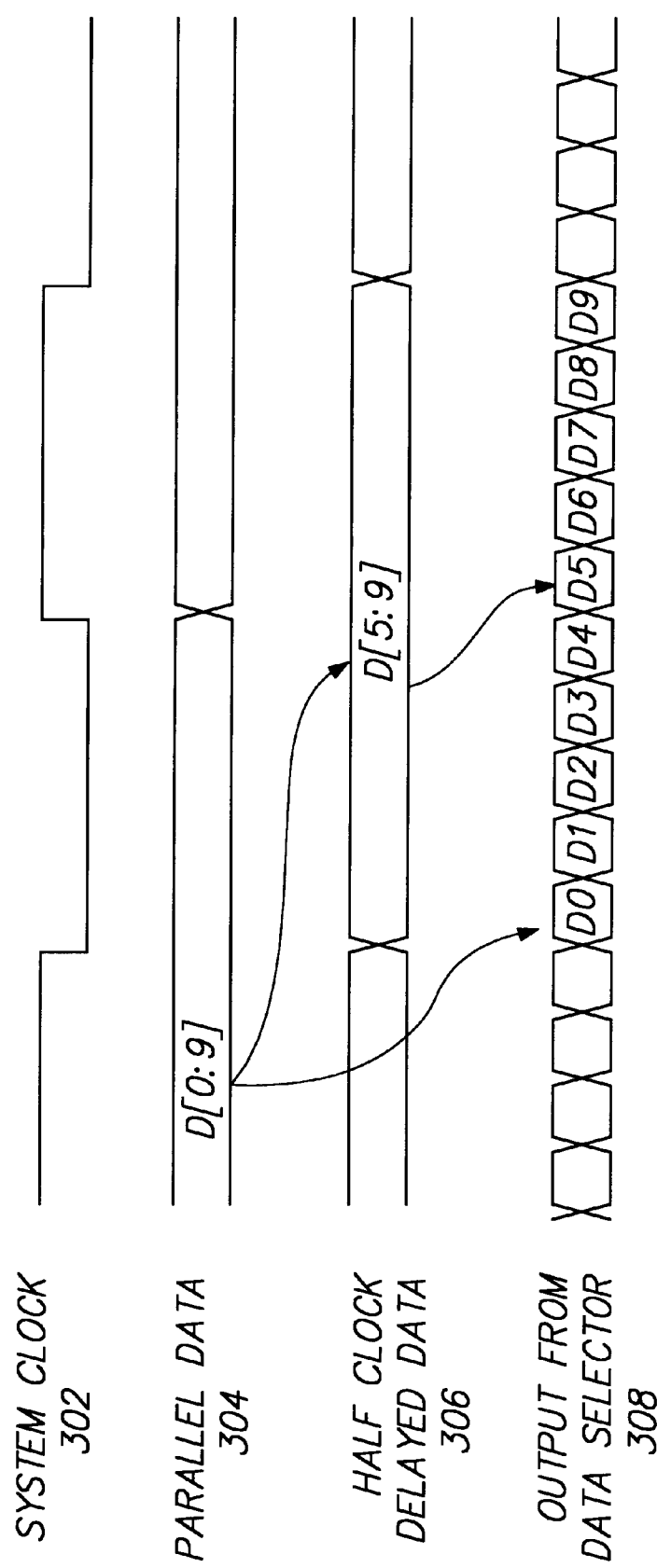
FIG. 3 is a timing diagram for the transmitter according to a preferred embodiment of the present invention.

FIG. 3 is a timing diagram for the transmitter 104 according to a preferred embodiment of the present invention. The signals shown in FIG. 3 include the system clock signal 302, the encoded parallel data signal 304, a first half clock delayed data signal 306, and data selector output signal 308.

The system clock signal 302 determines the timing at which the timing aligner 202 receives the encoded parallel data signal 304 from the encoder 102. For purposes of illustration, the encoded parallel data signal 304 in particular includes 10-bit data frames with bits labeled D[0:9]. In this embodiment, the timing aligner 202 delays the last 5 bits of each data frame by half of a system clock cycle to generate the first half clock delayed data signal 306.

The data selector 204 converts the encoded data from parallel to serial form. In this embodiment, both the parallel data signal 304 and the delayed data signal 306 are transferred to the data selector 204. The data selector 204 also receives the sender's clock signal from PLL 114. The frequency of the sender's clock signal in this particular case is ten (10) times the frequency of the system clock signal 302. The data selector output signal 308 is synchronized to the sender's clock signal.

The channel driver 206 receives the data selector output signal 308 and drives that signal onto the channel 101 in the form of an encoded data waveform. Signal level controller 208 controls the strength of the encoded data waveform driven by the channel driver 206.

Oversampler

FIG. 4 is a block diagram of an oversampler 106 located in the receiving side of the communication system according to a preferred embodiment of the present invention. The oversampler 106 includes a channel impedance controller 402, a channel amplifier 404, a sampler 406, and a timing aligner 408.

Figure 5:
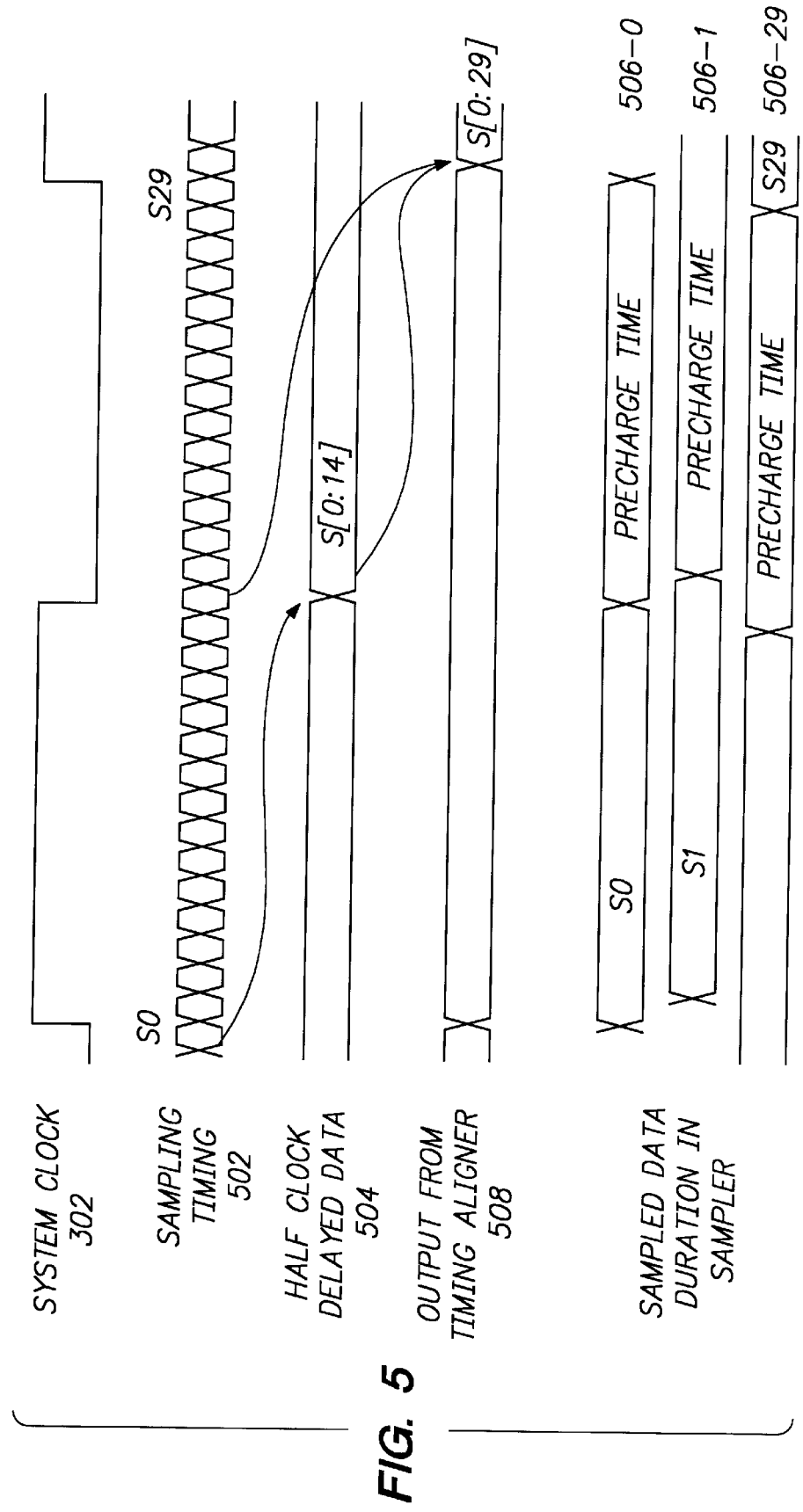
FIG. 5 is a timing diagram for the oversampler according to a preferred embodiment of the present invention.

FIG. 5 is a timing diagram for the oversampler 106 according to a preferred embodiment of the present invention. The signals shown in FIG. 5 include the system clock signal 302, sampling timing signal 502, second half clock delayed data signal 504, a series of sample data signals 506-0, 506-1, 506-2, . . . , 506-(xn−2), and 506-(xn−1) (where n=the number of bits in a data frame of the encoded data, and x=a multiplier due to the oversampling), and timing aligner output signal 508. In the particular example shown in FIG. 5, n=10, x=3 (for 3× oversampling), so xn=30.

The channel impedance controller 402 allows adjustments to be made to the input impedance of the receiver 105 so that the input impedance matches the channel impedance. The channel amplifier 404 receives the encoded data waveform and amplifies and/or shifts it so that the sampler 406 can better sense the features in the waveform.

The sampler 406 receives the amplified encoded data waveform from the channel amplifier 404 and the receiver's clock signal from the PLL 114. In the particular example illustrated in FIG. 5, the receiver's clock signal would have a frequency 30 times that of the system clock signal. The sampler 406 takes samples of the amplified waveform at a sampling frequency corresponding to the receiver's clock frequency. Thus, in a single system clock cycle, thirty (30) samples are taken in this particular case. These 30 samples are shown as S0 through S29 in the sampling timing signal 502, and the 30 samples correspond to a single oversampled data frame.

For the sampler 406 whose operation is illustrated in FIG. 5, the sampler 406 holds the sampled data for a duration of a half cycle of the system clock 302 and precharges circuits for a duration of the other half cycle. This is illustrated by the series of sample data signals 506-0, 506-1, 506-2, ..., 506-28, and 506-29 in FIG. 5. Therefore, for this sampler 406, it is needed for a device to hold the sampled data for a duration of the other half cycle. Such a device is the timing aligner 408. The timing aligner 408 holds the first half of the oversampled data frame (i.e. the first 15 of the 30 samples in this particular case) for the other half cycle. The timing aligner 408 also synchronizes the entire oversampled data frame and also outputs 508 the entire oversampled data frame beginning at the next cycle of the system clock signal 302.

Digital PLL

Figure 6:
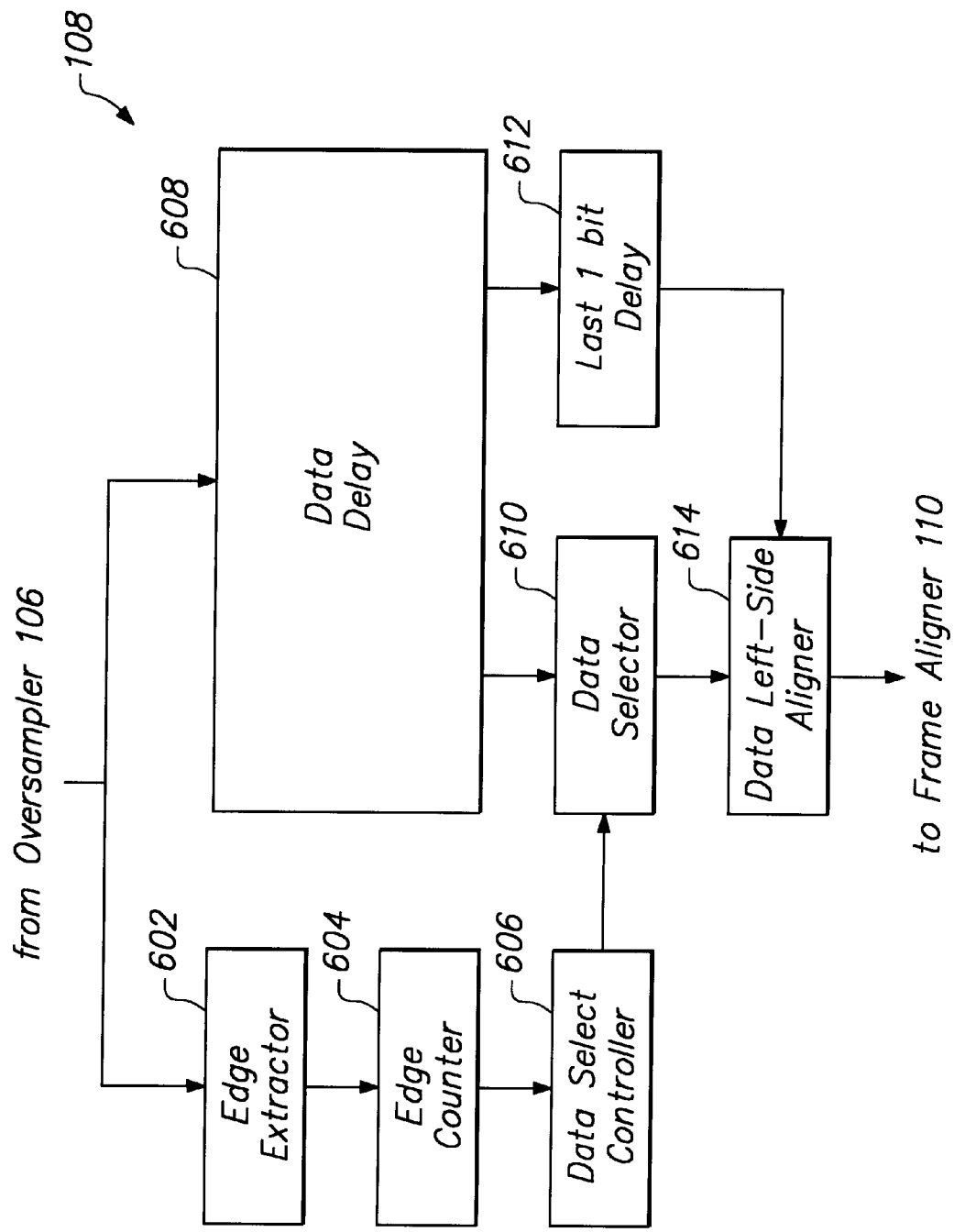
FIG. 6 is a block diagram of a digital phase locked loop (digital PLL) located in the receiving side of the communication system according to a preferred embodiment of the present invention.

FIG. 6 is a block diagram of a digital phase locked loop (digital PLL) 108 located in the receiving side of the communication system according to a preferred embodiment of the present invention. One function of the digital PLL 108 is to extract clock information, such as phase information, from the oversampled data stream 702. The digital PLL 108 includes an edge extractor 602, an edge counter 604, a data select controller 606, a data delay device 608, a data selector 610, a last 1-bit delay 612, and a data left-side aligner 614. FIG. 7 is a diagram illustrating the mapping of an oversampled data stream 702 to groups 706 and phases 704 within the digital PLL 108 according to a preferred embodiment of the present invention.

A current oversampled data stream 702 is received by the data delay device 608. The data delay device 608 holds the current oversampled data stream 702 and makes the current oversampled data stream 702 available to the data selector 610 until the data select controller 606 has determined the data selection position. The last 1-bit delay device 612 holds the last bit sample S29 from the previous oversampled data stream 702 and makes the last bit sample S29 available to the data selector 610 until the data select controller 606 has determined the data selection position. After the data selection position has been determined, the last 1-bit delay device 612 replaces the last bit sample S29 from the previous oversampled data stream 702 with the last bit sample S29 from the current oversampled data stream 702.

Figure 8:
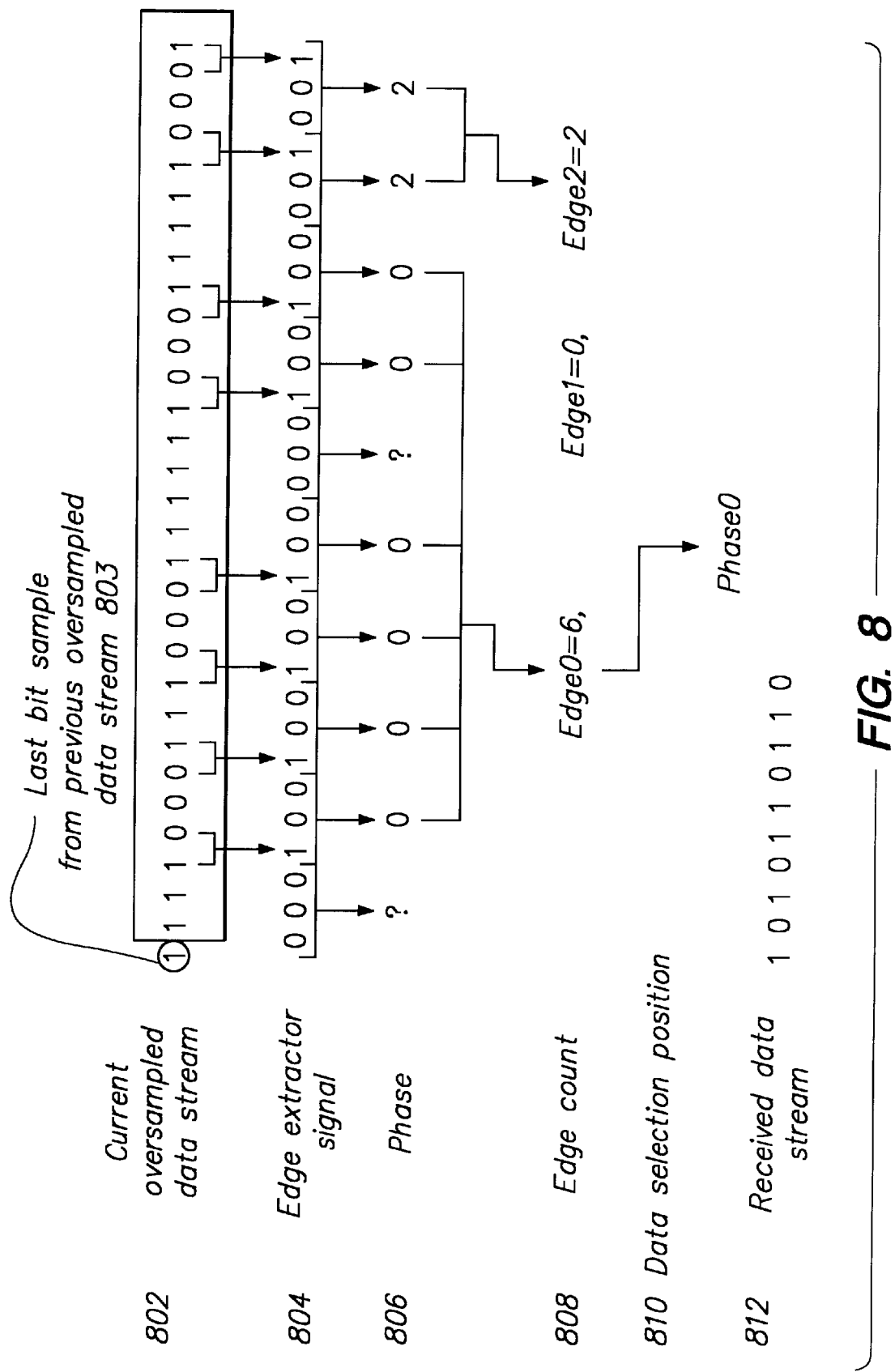
FIG. 8 is a diagram illustrating an example of data selection within the digital PLL according to a preferred embodiment of the present invention.

FIG. 8 is a diagram illustrating an example of data selection within the digital PLL 108 according to a preferred embodiment of the present invention. A current oversampled data stream 802 is received by the edge extractor 602 from the oversampler 106. The edge extractor 602 determines the locations of data transitions (edges) within the current oversampled data stream 802 and outputs an edge extractor signal 804. The edge extractor signal 804 has a value of one at locations where edges are found and has a value of zero elsewhere (where no edges are found). The edge counter 604 receives the edge extractor signal 804 and determines the phase 806 of any edge in each group of the current oversampled data stream 802. The edge counter 604 counts the number of edges with each phase. For a 3× oversampling system, the edge counter 604 counts the number of edges in phase0 (edge0), phase1 (edge1), and phase2 (edge2). The data select controller 606 uses phase information about the edges from the edge counter 604 to determine a data selection position. For the example shown in FIG. 8, the data selection position is phase2. The data selector 610 uses the data selection position from the data select controller 606 to select a received data stream 812 from the current oversampled data stream 802.

Figure 9:
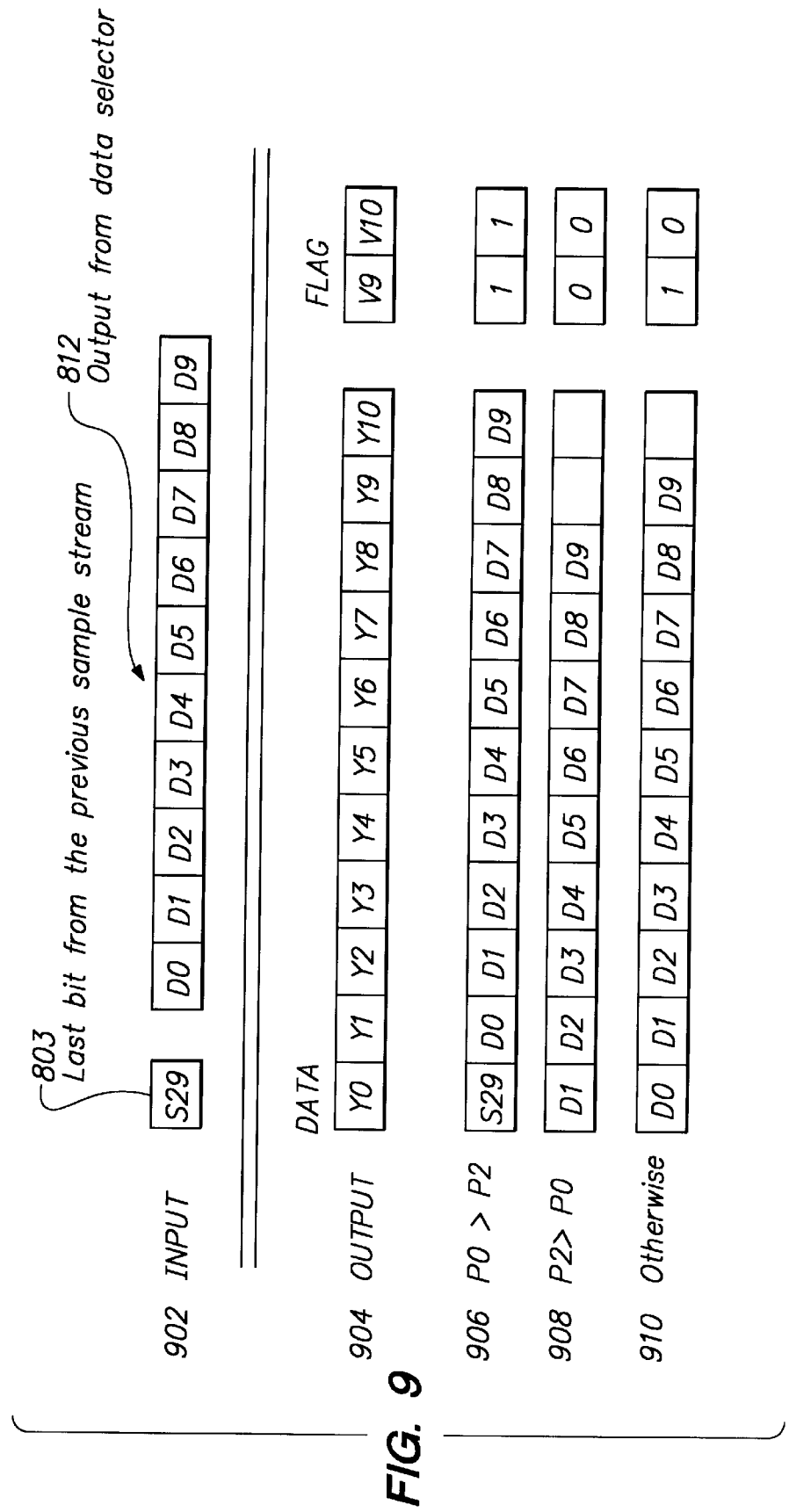
FIG. 9 is a diagram illustrating the operation of data alignment within the digital PLL according to a preferred embodiment of the present invention.

FIG. 9 is a diagram illustrating the operation of data alignment within the digital PLL 108 according to a preferred embodiment of the present invention. The data left-side aligner 614 receives as input 902 the last sample bit 803 [S29] from the last 1-bit delay device 612 and receives the received data stream 812 [D0:D9] from the data select controller 606. In this embodiment, the received data stream 812 comprises 10 bits [D0:D9]. In this embodiment, the data left-side aligner 614 generates as output 904 eleven data bits [Y0:Y10] and 2 flag bits [V9 and V10]. In this embodiment the eleven data bits and the two flag bits are determined as follows.

If the data selection position 810 for the previous oversampled data stream was phase0 [P0] and the data selection position 810 for the current oversampled data stream 802 is phase2 [P2], then, as shown by line 906, Y0=S29, Y1=D0, Y2=D1, Y3=D2, Y4=D3, ..., Y9=D8, and Y10=D9, and V9=V10=1. V9 and V10 represent valid bits for data bits Y9 and Y10, respectively. In this case, V9 and V10 both being one indicates that Y9 and Y10 both hold a valid data bit. Furthermore, in this case, S29 is used for Y0 in order to prevent a loss of one bit in the received data stream 812.

On the other hand, if the data selection position 810 for the previous oversampled data stream was phase2 [P2] and the data selection position 810 for the current oversampled data stream 802 is phase0 [P0], then, as shown by line 908, Y0=D1, Y1=D2, ..., Y7=D8, and Y8=D9, and V9=V10=0. In this case, V9 and V10 both being zero indicates that neither Y9 nor Y10 hold a valid data bit. Furthermore, in this case, D0 is discarded in order to remove a duplicated bit in the received data stream 812.

Figure 10:
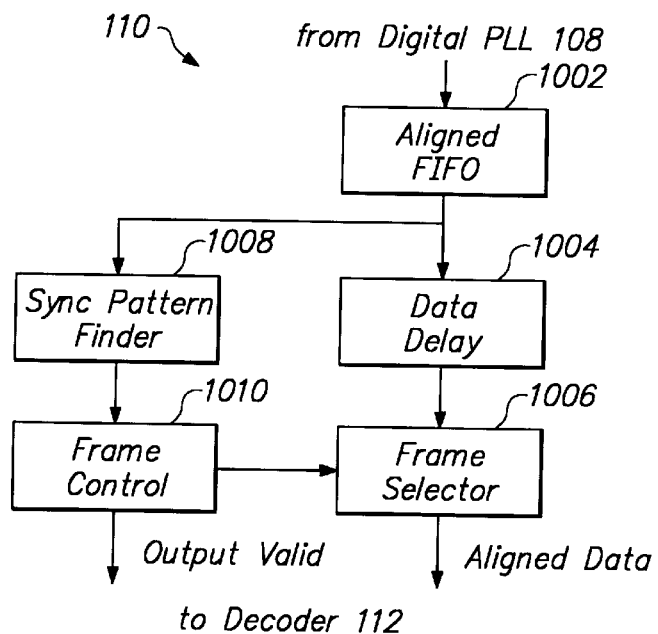
FIG. 10 is a block diagram of a frame aligner located in the receiving side of the communication system according to a preferred embodiment of the present invention.

Finally, in other cases that do not fall into the two above-described situations, then, as shown by line 910, Y0=D0, Y1=D1, ..., Y8=D8, and Y9=D9, and V9=1, and V10=0. For these cases, V9 being one indicates that Y9 holds a valid bit, but V10 being zero indicates that Y10 does not hold a valid bit Frame Aligner FIG. 10 is a block diagram of a frame aligner 110 located in the receiving side of the communication system according to a preferred embodiment of the present invention. The frame aligner 110 includes an aligned FIFO (first in first out) 1002, a data delay 1004, a frame selector 1006, a sync pattern finder 1008, and a frame controller 1010.

FIG. 11 is a diagram illustrating the operation of an aligned FIFO 1002 within the frame aligner 110 according to a preferred embodiment of the present invention. The aligned FIFO 1002 receives the output 904 (including 11 data bits [Y0:Y10] and 2 flag bits [V9 and V10]) from the data left-side aligner 614. In this embodiment, the aligned FIFO 1002 also contains 21 bits of data previously received from the data left-side aligner 614.

In the particular instance illustrated in FIG. 11, the "previous" data in aligned FIFO 1002 is shown in line 1102 and includes the following 32 bits: A9; B0–B9; C0–C9; and D0–D10. The "next" data in aligned FIFO 1002 are shown by line 1104 and are designated as the 32 bits X0–X31. The contents of the 32 bits X0–X31 depend upon the values of the two flag bits [V9 and V10] accompanying the 11 previous data bits D0–D10. If V9 and V10 were both zero, then D9 and D10 are not valid, so the next data in aligned FIFO 1002 are shown by line 1106. In this first case, the previous data in the aligned FIFO 1002 are shifted to the left by 9 bit places, and then the last 11 bit places X21–X31 are overwritten with newly received 11 data bits E0–E10. On the other hand, if V9=1 and V10=0, then D9 is valid, but D10 is not, so the next data in aligned FIFO 1002 are shown by line 1108. In this second case, the previous data in the aligned FIFO 1002 are shifted to the left by 10 bit places, and then the last 11 bit places X21–X31 are overwritten with newly received 11 data bits E0–E10. Finally, if V9 and V10 are both one, then D9 and D10 are both valid, so the next data in aligned FIFO 1002 are shown by line 1110. In this third case, the previous data in the aligned FIFO 1002 are shifted to the left by 11 bit places, and then the last 11 bit places X21–X31 are overwritten with newly received 11 data bits E0–E10.

Figure 13:
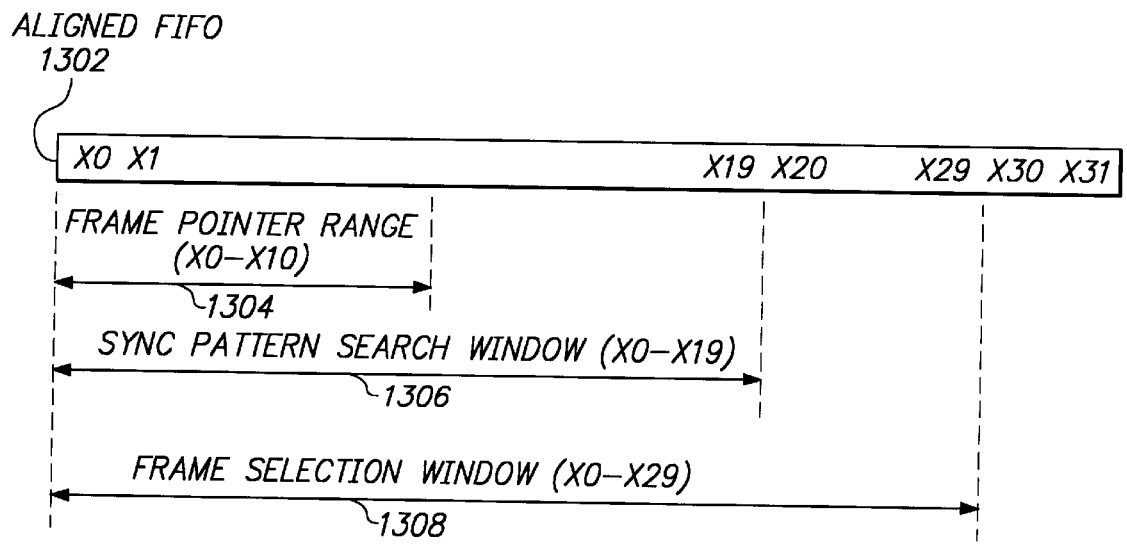
FIG. 13 is a diagram illustrating the usage of the various bits and ranges of bits in the aligned FIFO within the frame aligner according to a preferred embodiment of the present invention.
Figure 12:
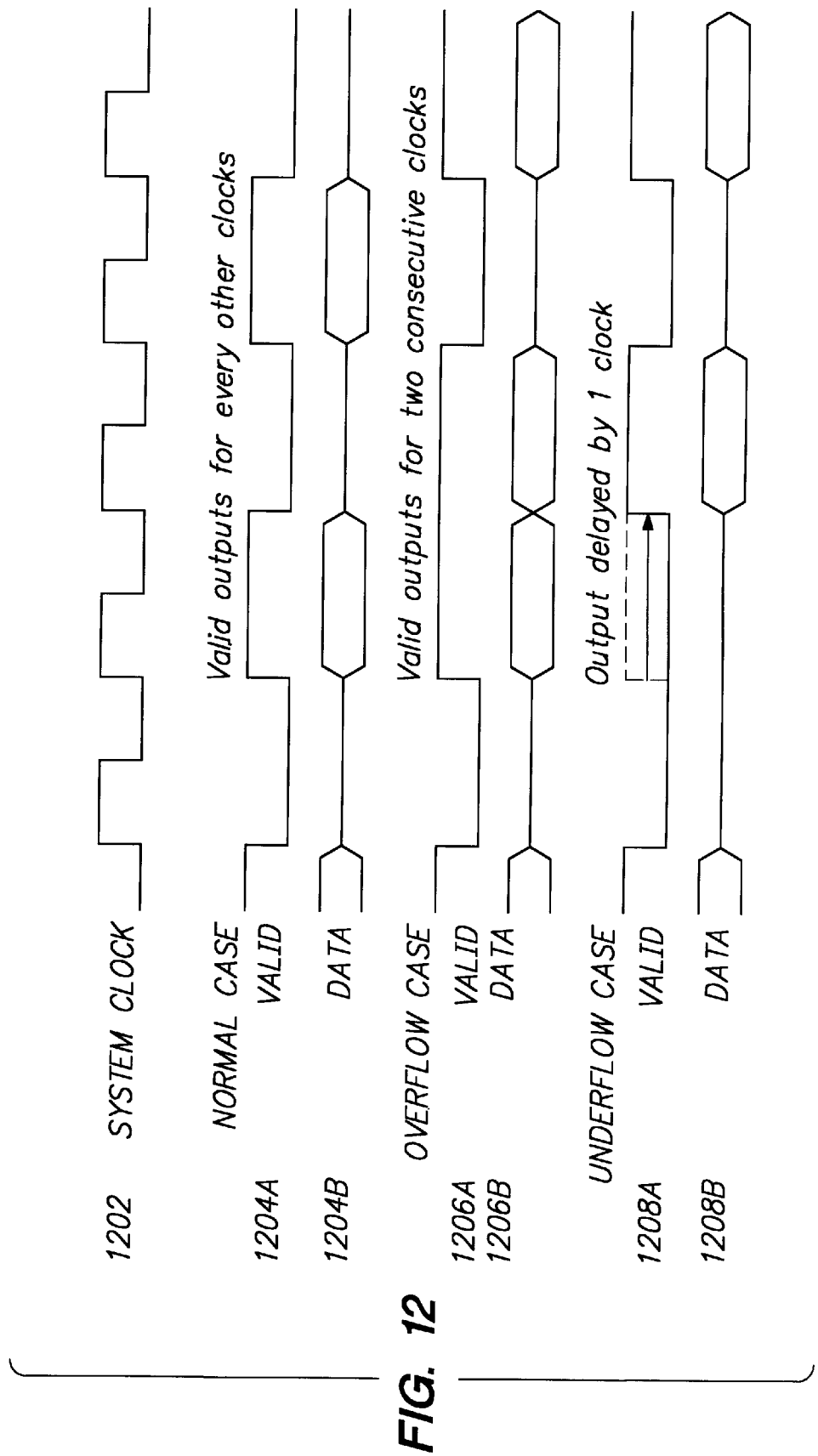
FIG. 12 is a timing diagram illustrating the output from the frame aligner according to a preferred embodiment of the present invention.

FIG. 12 is a timing diagram illustrating the output from the frame aligner 110 according to a preferred embodiment of the present invention. FIG. 13 is a diagram illustrating the usage of the various bits and ranges of bits in the aligned FIFO 1002 within the frame aligner 110 according to a preferred embodiment of the present invention.

The contents of the aligned FIFO 1002 are received by both the sync pattern finder 1008 and the data delay device 1004.

The data delay device 1004 selectively delays the contents of the aligned FIFO 1002 depending on the possible overflow or underflow situations. The data delay device 1004 outputs (possibly delayed) X0–X31 to the frame selector 1006. The frame selector 1006 selects a frame for output by the frame aligner 110. The frame is 20 bits wide and begins at a bit pointed to by a frame pointer. The frame pointer must lie within the frame pointer range 1304 of X0 to X10. Since the frame pointer range 1304 is from X0 to X10, and the frame is 20 bits wide, the window 1308 from which a frame may be possibly selected is from X0 to X29. The sync pattern finder 1008 searches for a synchronization (sync) pattern within the contents of the aligned FIFO 1002. In this embodiment, a frame may be aligned with a single sync pattern which is 10 bits wide. Such an alignment would be desirable if misalignment occurs during communication. Since the frame pointer range 1304 is from X0 to X10, and the sync pattern is 10 bits wide, the window 1306 over which a sync pattern must be search is from X0 to X19.

If a sync pattern is found by the sync pattern finder 1008, then the frame is realigned by the frame controller 1010 sending a signal to have the frame selector 1006 change the frame pointer to a position which is dependent upon the start position of the sync pattern. In addition, the frame controller 1010 sends an output invalid signal to the decoder 112. On the other hand, if a sync pattern is not found, then the frame controller 1010 causes the frame selector 1006 to update the frame pointer as described above according to the values of the flags V9 and V10. In addition, the frame controller 1010 sends an output valid signal to the decoder 112 when 20 bits of valid data are ready to be sent to the decoder 112..

The output from the frame aligner 110 is synchronized with the system clock signal 1202. In a normal case 1204, 20 bits of valid data are generated in every other cycle of the system clock. FIG. 12 shows the output valid signal 1204A and the output data signal 1204B by the frame aligner 110 for this normal situation. However, if the clock frequency of the transmitter is higher than that of the receiver, then once in a while an overflow case 1206 occurs. In an overflow case 1206, 20 bits of valid data are generated in two consecutive cycles of the system clock. FIG. 12 shows the output valid signal 1206A and the output data signal 1206B for this overflow situation. Furthermore, if the clock frequency of the receiver is higher than that of the transmitter, then once in a while an underflow case 1208 occurs. In an underflow case 1208, a delay of two consecutive cycles of the system clock is introduced so that the transmitter may "catch up" to the receiver. FIG. 12 shows the output valid signal 1208A and the output data signal 1208B for this underflow situation.

Figures 14, 15:
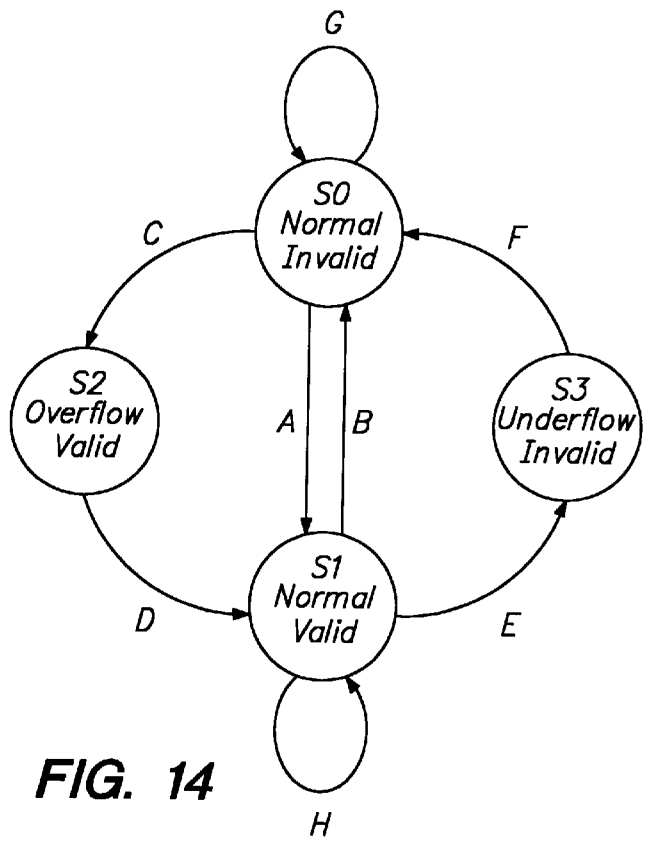
FIG. 14 is a state diagram of the operation of the frame aligner 110. Four states are shown.
FIG. 15 is a table including information regarding the example transitions represented by the graph arrows A–H in the state diagram of FIG. 14.

FIG. 14 is a state diagram of the operation of the frame aligner 110. Four states are shown: S0 for normal flow and invalid output; S1 for normal flow and valid output, S2 for overflow and valid output; and S3 for underflow and invalid output. Example transitions between states are also shown by the various arrows A to H.

FIG. 15 is a table including information regarding the example transitions represented by the graph arrows A–H in the state diagram of FIG. 14. The table includes values for the current flags V9 and V10, the current frame pointer, the next frame pointer, and the next valid bit.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, it would be relatively straightforward to extend the technique from 3× oversampling to arbitrary times oversampling.

What is claimed is:

1. A system for transmission and recovery of original digital data, the system including:

(a) an encoder for receiving the original digital data and encoding the original digital data to form encoded data frames, and for outputting the encoded data frames;

(b) a transmitter for receiving the encoded data frames, forming an encoded data stream, and transmitting the encoded data stream to a channel;

(c) a receiver for receiving the encoded data stream from the channel, the receiver including
 (1) an oversampler for oversampling the encoded data stream to form an oversampled data stream,
 (2) a digital phase locked loop for receiving the oversampled data stream, extracting clock information from the oversampled data stream, and generating selected data from the oversampled data stream using the clock information, and
 (3) a frame aligner for generating encoded data frames using the selected data;

(d) an analog phase locked loop for receiving a system clock signal having a system clock frequency, supplying a sender's clock signal having a sender's clock frequency to the transmitter, and supplying a receiver's clock signal having a receiver's clock frequency to the receiver, where the sender's clock frequency is approximately a first integer multiple of the system clock frequency, and where the receiver's clock frequency is approximately a second integer multiple of the sender's clock frequency; and (e) a decoder for receiving the encoded data frames from the frame aligner and for decoding the data frames to recover the original digital data 2. The system of claim 1, wherein the receiver's clock frequency is approximately the second integer multiple of the sender's clock frequency with less than 0.1% tolerance.

3. The system of claim 1, where the first integer multiple is at least ten, and the second integer multiple is at least three.

4. The system of claim 1, where the original digital data comprises digital data for display as images on a screen.

5. The system of claim 1, wherein (b) the transmitter includes:
   (1) a timing aligner for receiving the encoded data frames in parallel from the encoder and delaying a portion of each of the encoded data frames by a fraction of a cycle of the system clock signal;
   (2) a data selector for serializing the encoded data frames to form the encoded data stream which is synchronized with the sender's clock signal; and
   (3) a channel driver for driving the encoded data stream to the channel.

6. The system of claim 5, where the fraction of the cycle of the system clock signal is one half of the cycle of the system clock signal.

7. The system of claim 5, further including:
   a signal level controller coupled to the channel driver for determining a signal strength at which the channel driver drives the encoded data stream to the channel.

8. The system of claim 5, where the portion each of the encoded data frames is a latter half of each of the encoded data frames.

9. The system of claim 5, where the fraction of the cycle of the system clock signal is one half of the system clock signal.

10. The system of claim 1, wherein (c)(1) the oversampler includes:
    (i) a channel amplifier for receiving the encoded data stream from the channel and for amplifying a signal strength of the encoded data stream;
    (ii) a sampler for receiving the receiver's clock signal and for oversampling the encoded data stream at the receiver's clock frequency to form samplings in a first number of detect cells, where the first number equals a product of the first integer multiple and the second integer multiple; and
    (iii) a timing aligner for receiving a first portion of the samplings from the sampler, for holding the first portion of the samplings while corresponding detect cells are precharged, and for outputting the samplings in parallel to the digital phase locked loop.

11. The system of claim 10, wherein (c)(1) the oversampler further includes:
    (iv) a channel impedance controller for adjusting an input impedence of the receiver at the sender's clock frequency.

12. The system of claim 10, where the first portion of the samplings comprises a first half of the samplings.

13. The system of claim 10, where the first number is at least thirty.

14. The system of claim 1, wherein (c)(2) the digital PLL includes:
    (i) an edge extractor for generating a signal indicating positions of data transitions in the oversampled data stream; and
    (ii) a data select controller for determining a phase at which to select data from the oversampled data stream.

15. The system of claim 1 wherein (c)(3) the frame aligner includes:
    (i) a sync pattern finder for determining if the oversampled data stream contains a predetermined sync pattern.

16. The system of claim 1, wherein the receiver normally outputs encoded data frames during alternate cycles of the system clock signal.

17. The system of claim 16, wherein in an overflow situation, the receiver outputs encoded data frames during two consecutive cycles of the system clock signal.

18. The system of claim 16, wherein in an underflow situation, the receiver refrains from outputting encoded data frames during two consecutive cycles of the system clock signal.

19. A method for high-speed communication of digital data including:
    generating a sender's clock signal and a receiver's clock signal using a system clock signal, where the sender's clock signal is a first integer multiple of the system clock signal, and the receiver's clock signal is a second integer multiple of the sender's clock signal;
    receiving the digital data;
    encoding the digital data to generate encoded data frames;
    forming an encoded data stream from the encoded data frames;
    transmitting the encoded data stream to a channel in synchronization with the sender's clock signal;
    receiving the encoded data stream from the channel in synchronization with the receiver's clock signal;
    generating encoded data frames from the encoded data stream; and
    decoding the encoded data frames to regenerate the digital data.

20. A method for high-speed communication of digital data including:
    inputting the digital data to a transmitter, where during each cycle of a system clock signal one predetermined portion of the digital data is input;
    transmitting the digital data as a waveform from the transmitter to a channel, where during each cycle of the system clock signal one predetermined portion of the digital data is transmitted
    receiving the waveform from the channel to a receiver;
    oversampling the waveform to generate an oversampled data stream;
    determining the digital data from the oversampled data stream; and
    outputting the digital data from the receiver, where normally two predetermined portions of the digital data are output during each alternate cycle of the system clock signal, where for overflow situations the digital data is output during consecutive cycles of the system clock, and where for underflow situations no digital data is output during consecutive cycles of the system clock.

* * * * *

UNITED STATES PATENT AND TRADEMARK OFFICE
CERTIFICATE OF CORRECTION

PATENT NO. : 6,229,859 B1
DATED : May 8, 2001
INVENTOR(S) : Berstis

It is certified that error appears in the above-identified patent and that said Letters Patent is hereby corrected as shown below:

Column 11,
Line 11 and 52, "fist" should be -- first --.

Column 12,
Line 29, "posit ion" should be -- position --.
Line 61, "mean" should be -- means --.

Column 13,
Line 17, "fist" should be -- first --.

Signed and Sealed this

Eighth Day of January, 2002

Attest:

JAMES E. ROGAN
Attesting Officer   Director of the United States Patent and Trademark Office